US011749099B2

(12) United States Patent
Chen et al.

(10) Patent No.: US 11,749,099 B2
(45) Date of Patent: Sep. 5, 2023

(54) METHOD AND SYSTEM OF DETECTING DYNAMIC STATUS OF A SPACE

(71) Applicant: Wistron NeWeb Corporation, Hsinchu (TW)

(72) Inventors: Yi-An Chen, Hsinchu (TW); Wang-Hsing Huang, Hsinchu (TW); Chui-Chu Cheng, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 45 days.

(21) Appl. No.: 17/568,731

(22) Filed: Jan. 5, 2022

(65) Prior Publication Data

US 2022/0343752 A1 Oct. 27, 2022

(30) Foreign Application Priority Data

Apr. 23, 2021 (TW) .................................. 110114638

(51) Int. Cl.
*G08B 29/18* (2006.01)
*H04B 17/309* (2015.01)
*H04W 60/00* (2009.01)
*G08B 13/22* (2006.01)

(52) U.S. Cl.
CPC ........... *G08B 29/186* (2013.01); *G08B 13/22* (2013.01); *H04B 17/309* (2015.01); *H04W 60/00* (2013.01)

(58) Field of Classification Search
CPC ... H04B 17/3913; G08B 29/186; G01S 7/415; G01S 13/04; G01S 13/56
See application file for complete search history.

(56) References Cited

U.S. PATENT DOCUMENTS

| 10,393,866 | B1 * | 8/2019 | Kravets | G01S 13/003 |
| 11,397,258 | B2 * | 7/2022 | Zeng | G01S 7/415 |
| 2013/0113647 | A1 * | 5/2013 | Sentelle | G01S 13/04 342/22 |
| 2020/0191943 | A1 * | 6/2020 | Wu | G01S 13/726 |
| 2020/0351576 | A1 * | 11/2020 | Beg | H04W 64/006 |

FOREIGN PATENT DOCUMENTS

CN 111868569 A 10/2020

* cited by examiner

*Primary Examiner* — Mirza F Alam
(74) *Attorney, Agent, or Firm* — Winston Hsu

(57) ABSTRACT

A detecting method for detecting a dynamic status in a space, wherein at least two wireless communication devices are deployed in the space and capable of performing a channel state detection to obtain a channel state information, the detecting method comprising: controlling the at least two wireless communication devices to perform the channel state detection in a registration stage to obtain a plurality of registration-stage channel state information; determining an environmental data of the space according to the plurality of registration-stage channel state information; controlling the at least two wireless communication devices to perform the channel state detection in a detection stage to obtain a plurality of detection-stage channel state information; and determining an intrusion situation of the space according to the environmental data and the plurality of detection-stage channel state information.

16 Claims, 5 Drawing Sheets

METHOD AND SYSTEM OF DETECTING DYNAMIC STATUS OF A SPACE

BACKGROUND OF THE INVENTION

1. Field of the Invention

The present invention relates to a detecting method and a detecting system for detecting a dynamic status in a space, and more particularly, to a detecting method and a detecting system capable of performing comprehensive detection, quickly applying to different environments, and continuously optimizing to adapt to a real situation of an environment.

2. Description of the Prior Art

In order to improve the home safety, elderly care, office or factory security, border protection, etc., the intrusion detection has been widely adopted. In order to detect intruders, the prior art usually uses detectors to detect environmental information, so as to determine whether there is an abnormal signal, e.g., to use an infrared sensor to detect whether there is a heat source, to use a microphone to detect ambient sounds, to use an impact sensor to detect vibrations, etc. However, in addition to detecting intruders, these detectors may detect other signals generated by non-intruders, such as pet barks, abnormal infrared signals generated by pet movements, vibrations generated by falling objects, activities of a robotic vacuum cleaner, etc., such that false alarms may be frequently issued.

Another conventional intrusion detection technology uses image capturing equipments, such as installing a camera at a specific location to capture images or videos to determine whether there is an intruder. However, the intrusion detection based on the image capturing technology is limited by the condition of ambient light, and there are concerns about privacy leakage. Furthermore, a powerful real-time calculation is required to determine the intrusion states in real-time. More importantly, the image capturing equipment can only achieve a line-of-sight detection, and cannot penetrate walls, furniture, household appliances, etc. to reach a comprehensive detection, thereby having limitations.

Therefore, how to improve the shortcomings of the prior art has become one of the goals in the field.

SUMMARY OF THE INVENTION

Therefore, the present invention is to provide a detecting method and a detecting system for detecting a dynamic status in a space to improve the prior art.

An embodiment of the present invention discloses a detecting method for detecting a dynamic status in a space, wherein at least two wireless communication devices are deployed in the space and capable of performing a channel state detection to obtain a channel state information. The detecting method comprises controlling the at least two wireless communication devices to perform the channel state detection in a registration stage to obtain a plurality of registration-stage channel state information; determining an environmental data of the space according to the plurality of registration-stage channel state information; controlling the at least two wireless communication devices to perform the channel state detection in a detection stage to obtain a plurality of detection-stage channel state information; and determining an intrusion situation of the space according to the environmental data and the plurality of detection-stage channel state information.

An embodiment of the present invention further discloses a detecting system for detecting a dynamic status in a space, which comprises at least two wireless communication devices, deployed in the space and capable of performing a channel state detection to obtain a channel state information; and a computing device, comprising: a processing unit, configured to execute a program code; and a storage unit, coupled to the processing unit to store the program code, wherein the program code is configured to instruct the processing unit to execute the following steps: controlling the at least two wireless communication devices to perform the channel state detection in a registration stage to obtain a plurality of registration-stage channel state information; determining an environmental data of the space according to the plurality of registration-stage channel state information; controlling the at least two wireless communication devices to perform the channel state detection in a detection stage to obtain a plurality of detection-stage channel state information; and determining an intrusion situation of the space according to the environmental data and the plurality of detection-stage channel state information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
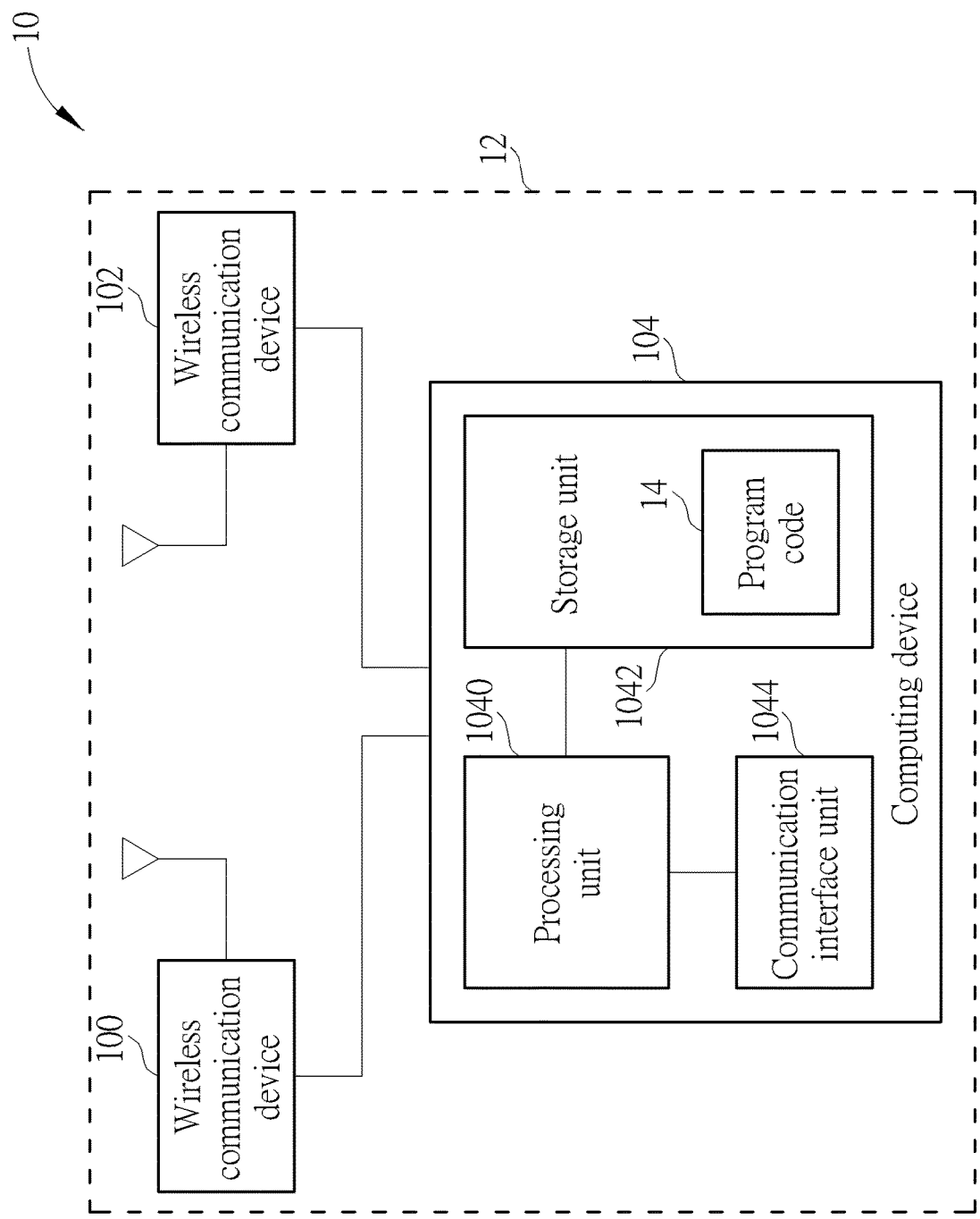
FIG. 1 is a schematic diagram of a detecting system according to an embodiment of the present invention.

Please refer to FIG. 1, which is a schematic diagram of a detecting system 10 according to an embodiment of the present invention. The detecting system 10 comprises two wireless communication devices 100, 102 and a computing device 104, and is utilized for detecting a dynamic status in a space 12, such as whether there is an intruder. The space 12 may be a house, an office, or a factory, etc., and is not limited thereto. The wireless communication devices 100, 102 are essential units for implementing the present invention; that is, the minimum requirement for achieving the present invention is comprising at least two wireless communication devices. Certainly, three or more than three wireless communication devices can achieve the present invention, which will not be repeated herein. The computing device 104 may be a local computing device or a cloud device, and comprises a processing unit 1040, a storage unit 1042, and a communication interface unit 1044. The processing unit 1040 may a microprocessor or an application-specific integrated circuit (ASIC). The storage unit 1042 may be any type of data storage devices for storing a program code 14, and the program code 14 is read and executed by the processing unit 1040. For example, the storage unit 1042 may be a read-only memory (ROM), a random-access memory (RAM), a CD-ROM, an optical data storage device, etc., and is not limited thereto. The communication interface unit 1044 may exchange signals with other devices (such as wireless communication devices 100, 102 or external devices) through a wired or wireless communication method.

Figure 2:
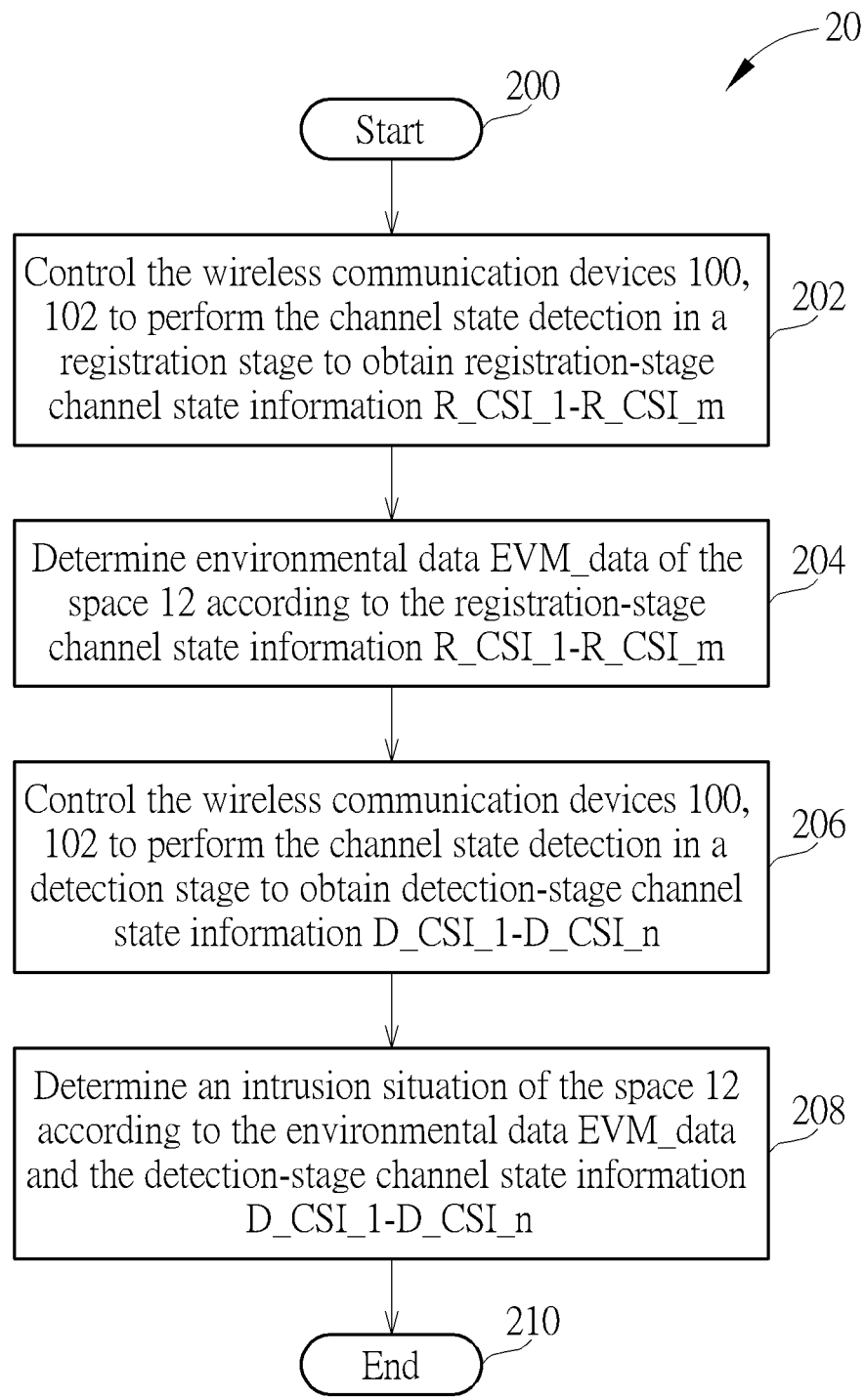
FIG. 2 is a schematic diagram of a process according to an embodiment of the present invention.

Please refer to FIG. 2, which is a schematic diagram of a process 20 according to an embodiment of the present invention. The process 20 is used for the detecting system 10 shown in FIG. 1 to detect the dynamic status in the space 12. The process 20 may be complied as the program code 14, and comprises the following steps:

Step 200: Start.
Step 202: Control the wireless communication devices 100, 102 to perform channel state detection in a registration stage to obtain registration-stage channel state information R_CSI_1-R_CSI_m.
Step 204: Determine environmental data EVM_data of the space 12 according to the registration-stage channel state information R_CSI_1-R_CSI_m.
Step 206: Control the wireless communication devices 100, 102 to perform the channel state detection in a detection stage to obtain detection-stage channel state information D_CSI_1-D_CSI_n.
Step 208: Determine an intrusion situation of the space 12 according to the environmental data EVM_data and the detection-stage channel state information D_CSI_1-D_CSI_n.
Step 210: End.

According to the process 20, the detecting system 10 enters the registration stage in Step 202 and controls the wireless communication devices 100, 102 to perform the channel state detection to obtain the registration-stage channel state information R_CSI_1-R_CSI_m. In the registration stage, in order to eliminate the influence of dynamic objects on the channel state detection performed by the wireless communication devices 100, 102, the dynamic objects in the space 12 have to be moved out of the space 12 or kept from moving. For example, if the space 12 is a house, people and pets therein should be asked to move out of the space 12, and automatic equipments therein, such as robotic vacuum cleaners, should be suspended before the registration stage. If the space 12 is a factory, the operator therein should be asked to move out of the space 12, and machines and/or other equipments therein should be suspended before the registration stage. Thus, the channel state information R_CSI_1-R_CSI_m obtained by the detecting system 10 in the registration stage may obviate the influence of personnel or equipments. Accordingly, in Step 204, the detecting system 10 determines the environmental data EVM_data of the space 12 according to the registration-stage channel state information R_CSI_1-R_CSI_m. Then, the detecting system 10 enters the detection stage in Step 206, and controls the wireless communication devices 100, 102 to continuously perform the channel state detection to obtain the detection-stage channel state information D_CSI_1-D_CSI_n. According to the environmental data EVM_data and the detection-stage channel state information D_CSI_1-D_CSI_n, the detecting system 10 continuously determines whether there is an intruder in the space 12 in Step 208, and may timely output the detection result to an external warning device through the communication interface unit 1044.

Briefly, before performing the intrusion detection, the detecting system. 10 needs to perform the registration stage to obtain the environmental data EVM_data having no human influence. After that, when entering the detection stage, the environmental data EVM_data may be a standard for determining whether there is an intruder. Therefore, the detecting system 10 may adapt to various environments and make decisions correctly. Moreover, since the channel state detection is not limited by line-of-sight, the present invention is capable of performing the comprehensive detection.

Note that, the registration stage is to exclude the human influence. However, there are other dynamic environmental variable factors in a house, an office, or a factory, etc., such as curtains fluttering caused by the wind, robotic vacuum cleaner movements, object movements caused by hits of the robotic vacuum cleaner, and pet movements. Although these dynamic environmental variable factors are not caused by humans or intruders, they still influence the channel state detection and may further be determined as intruders. In this case, an embodiment of the present invention may further adopt a deep learning technology, such as multilayer perceptron (MLP), deep neural network (DNN), convolutional neural network (CNN), recurrent neural network (RNN), etc. to analyze, learn, and classify the obtained channel state information, and continuously train the deep learning model to optimize the determination accuracy.

Figure 3:
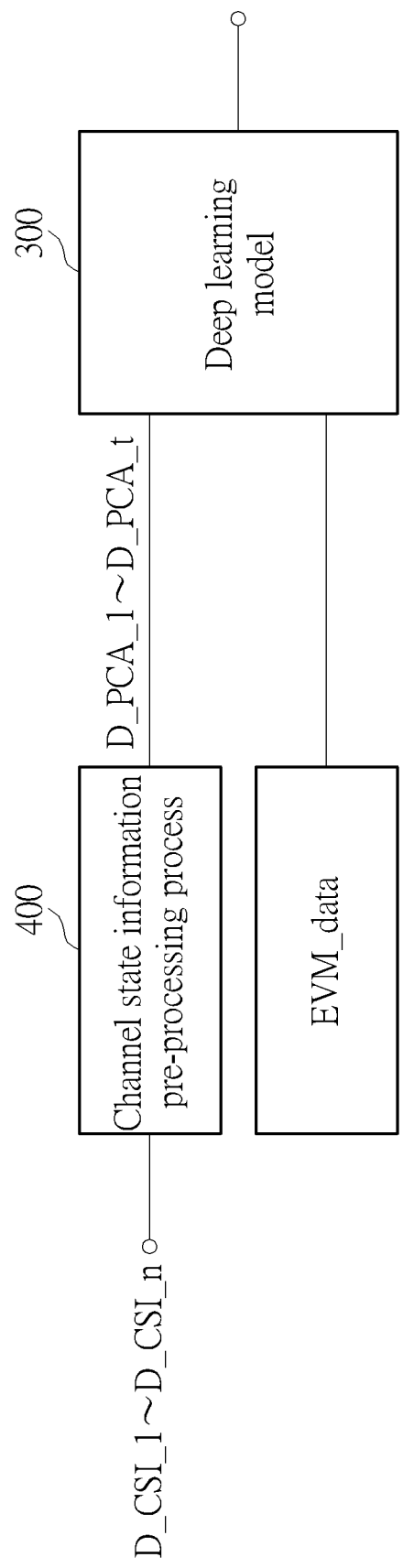
FIG. 3 is a schematic diagram of a deep learning model according to an embodiment of the present invention.

In detail, as shown in FIG. 3, in order to perform the deep learning, an embodiment of the present invention may build a deep learning model 300 to continuously train and determine whether there is an intruder according to the environmental data EVM_data and the detection-stage channel state information D_CSI_1-D_CSI_n. The deep learning model 300 may be built in the computing device 104, such as compiled in the program code 14, or built in an external computing device and communicating with the detecting system 10 through the communication interface unit 1044.

Figure 4:
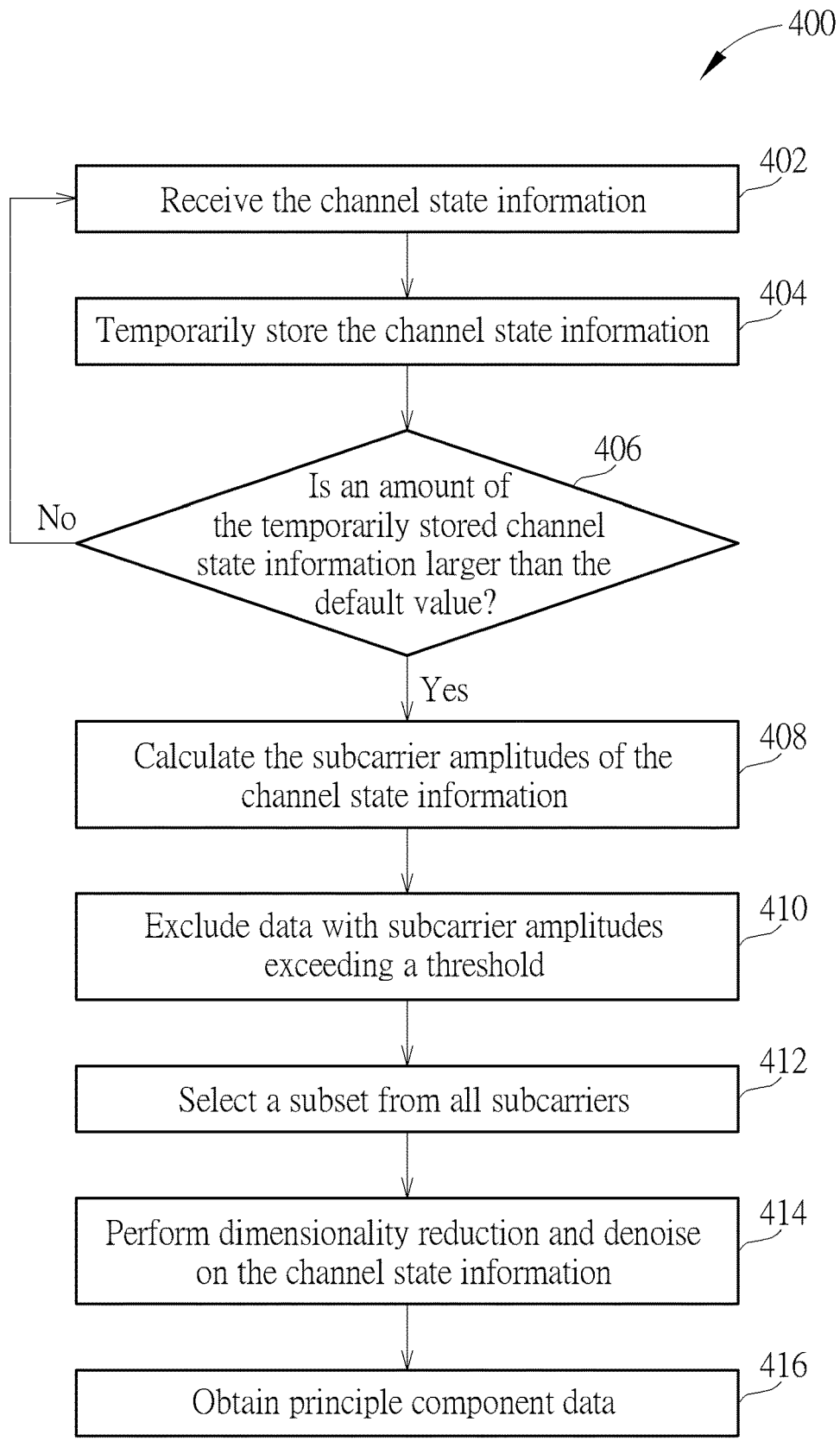
FIG. 4 is a schematic diagram of a channel state information pre-processing process according to an embodiment of the present invention.

First, data input to the deep learning model 300 should undergo dimensionality reduction, decorrelation, and feature extraction. For example, the principal component analysis (PCA) may be used to convert the representative channel state information into principal component data. This operation is referred to as the channel state information pre-processing process 400 hereinafter. Please refer to FIG. 4, which is a schematic diagram of an embodiment of the channel state information pre-processing process 400. In the embodiment of FIG. 4, after the detecting system 10 (in Step 402) obtains channel state information (such as R_CSI_1-R_CSI_m, D_CSI_1-D_CSI_n), the channel state information may be temporarily stored (Step 404); after receiving a predetermined amount of channel state information (Step 406), the corresponding subcarrier amplitudes may be computed (Step 408), and abnormal values therein may be excluded, such as data with subcarrier amplitudes exceeding a threshold (Step 410), to strengthen reliability. Then, a subset may be selected from all subcarriers (Step 412), and the principal component analysis is applied for performing dimensionality reduction and denoise on the channel state information (Step 414) to convert to principal component data (Step 416). The above-mentioned channel state information pre-processing process is the pre-process of the deep learning, which is an ordinary skill in the art, and should be performed on the registration-stage channel state information R_CSI_1-R_CSI_m and the detection-stage channel state information D_CSI_1-D_CSI_n, to respectively obtain registration-stage principal component data R_PCA_1-R_PCA_s and detection-stage principal component data D_PCA_1-D_PCA_t.

Figure 5:
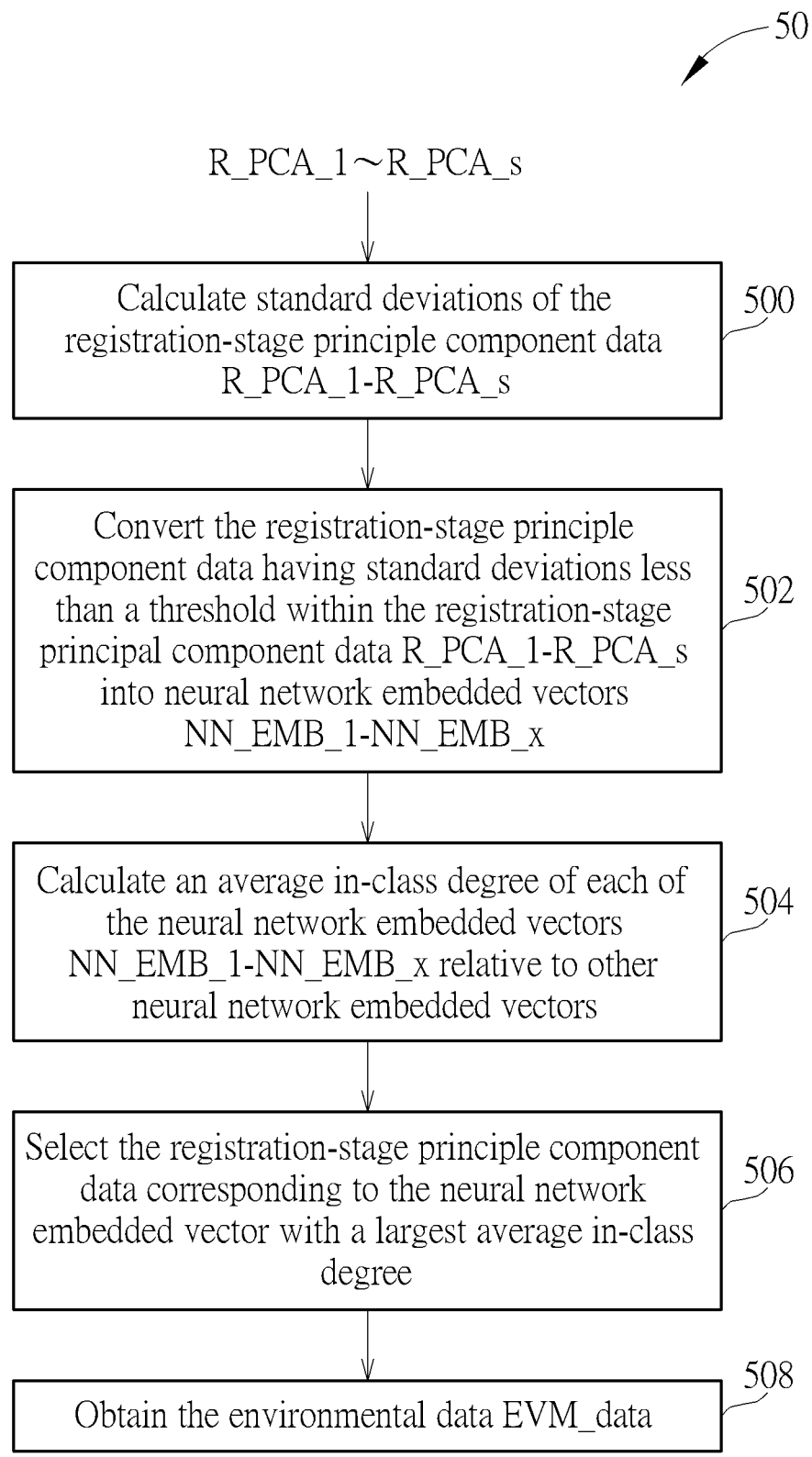
FIG. 5 is a schematic diagram of a process of a registration stage according to an embodiment of the present invention.

After the channel state information pre-processing process is performed, principal component data may be inputted into the deep learning model 300 to complete the registration stage or perform the intrusion detection in the detection stage. The registration stage may be represented by a process 50 shown in FIG. 5. As shown in FIG. 5, after receiving the registration-stage principal component data R_PCA_1-R_P-CA_s (obtained from the channel state information pre-processing process 400), the deep learning model 300 first calculates standard deviations of the registration-stage principal component data R_PCA_1-R_PCA_s (Step 500), then converts the registration-stage principal component data having standard deviations less than a threshold within the registration-stage principal component data R_PCA_1-R_P-CA_s into neural network embedded vectors NN_EMB_1-NN_EMB_x (Step 502), where x is greater than a default value. In actual practice, the deep learning model 300 may calculate the standard deviation of each of the registration-stage principal component data R_PCA_1-R_PCA_s, continuously collect the principal component data having standard deviations less than a threshold until the amount x is reached, and convert into the neural network embedded vectors NN_EMB_1-NN_EMB_x. However, the operation method is not specifically limited as long as a specific amount of neural network embedding vectors can be obtained. Then, the deep learning model 300 may respectively calculate an average in-class degree of each of the neural network embedded vectors NN_EMB_1-NN_EMB_x relative to other neural network embedded vectors (Step 504), and select the registration-stage principal component data corresponding to the neural network embedded vector with a largest average in-class degree (Step 506) as the environmental data EVM_data (Step 508).

On the other hand, in the detection stage, the detecting system 10 may input both the detection-stage principal component data D_PCA_1-D_PCA_t and the environmental data EVM_data into the deep learning model 300. The deep learning model 300 then analyzes the environmental data EVM_data and the detection-stage principal component data D_PCA_1-D_PCA_t to classify the environmental state of the space 12 into a plurality of categories, and when a detection-stage principal component data falls within an intrusion category thereof, the deep learning model 300 determines that there is at least one intruder in the space 12. The main purpose of analyzing the environmental data EVM_data and the detection-stage principal component data D_PCA_1-D_PCA_t is to distinguish the differences of the principal component data with and without intruders. In addition, the environmental state without intruders may be further distinguished, such as no intruders plus high, medium or low environmental noise (hereinafter referred to as high-noise non-intrusion category, medium-noise non-intrusion category, and low-noise non-intrusion category). For example, if the space 12 is a house, the high-noise non-intrusion category may correspond to situations, such as pet running, robotic vacuum cleaner activities, etc.; the medium-noise non-intrusion category may correspond to situations, such as objects falling, curtains fluttering, etc.; and the low-noise non-intrusion category may correspond to the situation that there is no interfering object. In this case, the deep learning model 300 may distinguish the noise level without intruders in addition to the situations with intruders, which is helpful for subsequent training of the deep learning model 300, thereby improving the robustness of the deep learning model 300.

Note that, the deep learning technologies may generally be divided into two major stages, which is a "learning/training" stage, and a "inference/prediction" stage. The former requires a large amount of data to generalize the determination logic for the latter to use. However, the definitions of the registration stage and the detection stage of the detecting system 10 differ from those of the above-mentioned two stages. Specifically, after the registration stage of the embodiment of the present invention is completed, the detecting system 10 may be regarded as having completed a preliminary learning process of the unmanned environment. At this time, the deep learning model 300 is capable of determining whether there is an intruder according to the environmental data EVM_data. However, due to different variable factors in the environment, which may change over time or change irregularly, if the detecting system 10 is only based on the environmental data EVM__data obtained in the registration stage, the detecting system 10 may not be able to adapt to the real situation of the environment. In this case, the embodiment of the present invention may use an appropriate training method to apply the subsequently received detection-stage channel state information to train the deep learning model 300. That is to say, through the registration stage, the deep learning model 300 of the embodiment of the present invention may save the lengthy learning and training stage; and through the detection stage, the deep learning model 300 may continuously train to optimize the determination accuracy in addition to determining the intrusion situation.

Furthermore, classifying the non-intruder environmental states is not only generalizing the environmental situations without intruders, but also facilitating determining the influence of intruders, and may be trained with human behaviors to strengthen the robustness of the deep learning model 300. On the other hand, in addition to excluding humans from training in the registration stage, in one embodiment, various variable factors such as humans and pets may be added for further training. Moreover, in addition to determining whether there is an intruder in the detection stage, an embodiment of the present invention may determine the behavior of the intruder after appropriately training to improve the accuracy. For example, when it is determined that there is an intruder who is walking, a warning may be issued to reduce the occurrence of erroneous determinations.

Furthermore, the training method of the deep learning model 300 of the embodiment of the present invention should be appropriately adjusted according to different requirements, which may be well-known training methods such as error backpropagation, stochastic gradient descent, learning rate decay, dropout, max pooling, batch normalization, long short-term memory (LSTM), transfer learning, etc., and are not limited thereto. Those skilled in the art may adopt an appropriate training method according to the adopted neural networks, algorithms, etc.

Note that, the foregoing embodiments are to illustrate the concept of the present invention, and those skilled in the art may make various modifications accordingly, and are not limited thereto. For example, in FIG. 1, although the computing device 104 is coupled to the wireless communication devices 100 and 102, the computing device 104 may be only coupled to one wireless communication device served as a receiving end therein. In addition, although the computing device 104 is illustrated in the space 12, it is not limited thereto, and the computing device 104 may be an external device deployed outside the space 12, such as a cloud device. Furthermore, as mentioned above, the wireless communication devices 100, 102 represent the minimum requirement for achieving the present invention, and the detecting system 10 may also comprise three or more than three wireless communication devices, which may comply with Wi-Fi specifications, operate in the ISM frequency band (such as 5 GHz), or be a part or whole of a mesh network.

On the other hand, in Step 204, the detecting system 10 determines the environmental data EVM_data of the space 12 according to the registration-stage channel state information R_CSI_1-R_CSI_m. However, if the computing device 104 cannot correctly calculate or obtain the environmental data EVM_data, the detecting system 10 may adopt a default environmental data EVM_data in an embodiment, for example, to pre-store the environmental data EVM_data corresponding to spaces of 0-10 m², 10-20 m², etc., so that the user may select appropriate environmental data EVM_data according to the size of the space 12.

In addition, before entering the registration stage and the detection stage, the deep learning model 300 may also be checked whether it works regularly, and a warning may be issued when the deep learning model 300 fails to work regularly. The deep learning model 300 classifies the environmental state to help strengthening the robustness of the deep learning model 300, wherein the classification method and the amount of categories are not limited, and may be appropriately adjusted according to the environmental requirements.

In order to detect the environmental state, the conventional technology usually installs various detectors or image capturing equipment. The former is prone to issue false alarms, while the latter is limited by the ambient light, has privacy leakage concerns, requires powerful real-time computation, and can only achieve line-of-sight detection. In comparison, the present invention uses channel state detection to determine the environmental state, which is free from the line-of-sight detection, and may perform the comprehensive detection. In addition, the present invention uses the registration stage to obtain environmental data without human influence so as to quickly apply to different environments. Furthermore, the present invention may adopt the deep learning technology to analyze, learn, and classify the obtained data, continuously train the deep learning model to optimize the determination accuracy, and thereby adapt to the real situation of the environment.

In summary, the detecting method and the detecting system of the present invention are free from the line-of-sight detection, may perform the comprehensive detection, may quickly apply to different environments, and may continuously optimize to adapt to the real situation of the environment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detecting method for detecting a dynamic status in a space, wherein at least two wireless communication devices are deployed in the space and capable of performing a channel state detection to obtain a channel state information, the detecting method comprising:
   controlling the at least two wireless communication devices to perform the channel state detection in a registration stage to obtain a plurality of registration-stage channel state information;
   determining an environmental data of the space according to the plurality of registration-stage channel state information;
   controlling the at least two wireless communication devices to perform the channel state detection in a detection stage to obtain a plurality of detection-stage channel state information; and
   determining an intrusion situation of the space according to the environmental data and the plurality of detection-stage channel state information;
   wherein the step of determining the environmental data of the space according to the plurality of registration-stage channel state information comprises:
      using a principal component analysis to convert the plurality of registration-stage channel state information into a plurality of registration-stage principal component data; and
      using a deep learning model to select a registration-stage principal component data from the plurality of registration-stage principal component data as the environmental data.

2. The detecting method of claim 1, wherein a plurality of dynamic objects in the space have been moved out of the space in the registration stage.

3. The detecting method of claim 1, wherein the step of converting the plurality of registration-stage channel state information into the plurality of registration-stage principal component data comprises excluding data with subcarrier amplitudes exceeding a threshold in the plurality of registration-stage channel state information.

4. The detecting method of claim 1, wherein the step of using the deep learning model to select the registration-stage principal component data from the plurality of registration-stage principal component data as the environmental data comprises:
   calculating a standard deviation of the plurality of registration-stage principal component data;
   using the deep learning model to convert registration-stage principal component data with standard deviations less than a threshold in the plurality of registration-stage principal component data into a plurality of neural network embedded vectors, wherein an amount of the plurality of neural network embedded vectors is greater than a default value;
   respectively calculating an average in-class degree of each neural network embedded vector of the plurality of neural network embedded vectors relative to other neural network embedded vectors; and
   selecting the registration-stage principal component data corresponding to the neural network embedded vector with a largest average in-class degree in the plurality of neural network embedded vectors as the environmental data.

5. The detecting method of claim 1, wherein the step of determining the intrusion situation of the space according to the environmental data and the plurality of detection-stage channel state information comprises:
   using the principal component analysis to convert the plurality of detection-stage channel state information into a plurality of detection-stage principal component data;
   using the deep learning model to analyze the environmental data and the plurality of detection-stage principal component data, to classify an environmental state of the space into a plurality of categories;
   determining that there is at least one intruder in the space, when one of the plurality of detection-stage principal component data falls within an intrusion category of the plurality of categories.

6. The detecting method of claim 5, wherein the step of converting the plurality of detection-stage channel state information into the plurality of detection-stage principal component data comprises excluding detection-stage channel state information with subcarrier amplitudes exceeding a threshold in the plurality of detection-stage channel state information, and converting the remaining detection-stage channel state information into the plurality of detection-stage principal component data.

7. The detecting method of claim 5, further comprising generating a warning signal after determining that there is at least one intruder in the space.

8. The detecting method of claim 1, further comprising training the deep learning model with the plurality of detection-stage channel state information.

9. A detecting system for detecting a dynamic status in a space, comprising:
   at least two wireless communication devices, deployed in the space and capable of performing a channel state detection to obtain a channel state information; and
   a computing device, comprising:
      a processing unit, configured to execute a program code; and
      a storage unit, coupled to the processing unit to store the program code, wherein the program code is configured to instruct the processing unit to execute the following steps:
         controlling the at least two wireless communication devices to perform the channel state detection in a registration stage to obtain a plurality of registration-stage channel state information;
         determining an environmental data of the space according to the plurality of registration-stage channel state information;
         controlling the at least two wireless communication devices to perform the channel state detection in a detection stage to obtain a plurality of detection-stage channel state information; and
         determining an intrusion situation of the space according to the environmental data and the plurality of detection-stage channel state information;
      wherein the step of determining the environmental data of the space according to the plurality of registration-stage channel state information comprises:
         using a principal component analysis to convert the plurality of registration-stage channel state information into a plurality of registration-stage principal component data; and
         using a deep learning model to select a registration-stage principal component data from the plurality of registration-stage principal component data as the environmental data.

10. The detecting system of claim 9, wherein a plurality of dynamic objects in the space have been moved out of the space in the registration stage.

11. The detecting system of claim 9, wherein the step of converting the plurality of registration-stage channel state information into the plurality of registration-stage principal component data comprises excluding data with subcarrier amplitudes exceeding a threshold in the plurality of registration-stage channel state information.

12. The detecting system of claim 9, wherein the step of using the deep learning model to select the registration-stage principal component data from the plurality of registration-stage principal component data as the environmental data comprises:
   calculating a standard deviation of the plurality of registration-stage principal component data;
   using the deep learning model to convert registration-stage principal component data with standard deviations less than a threshold in the plurality of registration-stage principal component data into a plurality of neural network embedded vectors, wherein an amount of the plurality of neural network embedded vectors is greater than a default value;
   respectively calculating an average in-class degree of each neural network embedded vector of the plurality of neural network embedded vectors relative to other neural network embedded vectors; and
   selecting the registration-stage principal component data corresponding to the neural network embedded vector with a largest average in-class degree in the plurality of neural network embedded vectors as the environmental data.

13. The detecting system in claim 9, wherein the step of determining the intrusion situation of the space according to the environmental data and the plurality of detection-stage channel state information comprises:
   using the principal component analysis to convert the plurality of detection-stage channel state information into a plurality of detection-stage principal component data;
   using the deep learning model to analyze the environmental data and the plurality of detection-stage principal component data, to classify an environmental state of the space into a plurality of categories;
   determining that there is at least one intruder in the space, when one of the plurality of detection-stage principal component data falls within an intrusion category of the plurality of categories.

14. The detecting system in claim 13, wherein the step of converting the plurality of detection-stage channel state information into the plurality of detection-stage principal component data comprises excluding detection-stage channel state information with subcarrier amplitudes exceeding a threshold in the plurality of detection-stage channel state information, and converting the remaining detection-stage channel state information into the plurality of detection-stage principal component data.

15. The detecting system in claim 13, wherein the program code further instructs the processing unit to generate a warning signal after determining that there is at least one intruder in the space.

16. The detecting system in claim 9, wherein the program code further instructs the processing unit to train the deep learning model with the plurality of detection-stage channel state information.

* * * * *